(12) United States Patent
Sieding et al.

(10) Patent No.: US 10,480,112 B2
(45) Date of Patent: Nov. 19, 2019

(54) METHOD FOR OPERATING A DOMESTIC APPLIANCE, AND DOMESTIC APPLIANCE

(71) Applicant: MIELE & CIE. KG, Guetersloh (DE)

(72) Inventors: Dirk Sieding, Luenen (DE); Helge Mueller, Guetersloh (DE); Bernd Merling, Bielefeld (DE); Rainer Bicker, Verl (DE); Hartmut Linnemann, Rheda-Wiedenbrueck (DE); Karsten Henn, Bielefeld (DE); Jakob Wilken, Bielefeld (DE)

(73) Assignee: Miele & Cie. KG, Gütersloh (DE)

( * ) Notice: Subject to any disclaimer, the term of this patent is extended or adjusted under 35 U.S.C. 154(b) by 538 days.

(21) Appl. No.: 14/569,822

(22) Filed: Dec. 15, 2014

(65) Prior Publication Data
US 2015/0167226 A1    Jun. 18, 2015

(30) Foreign Application Priority Data

Dec. 17, 2013 (DE) ........................ 10 2013 114 206

(51) Int. Cl.
*D06F 37/42* (2006.01)
*D06F 58/28* (2006.01)
(Continued)

(52) U.S. Cl.
CPC .............. *D06F 37/42* (2013.01); *D06F 33/02* (2013.01); *D06F 37/02* (2013.01); *D06F 37/304* (2013.01);
(Continued)

(58) Field of Classification Search
CPC .......... D06F 37/42; D06F 58/28; D06F 58/08; D06F 33/02; D06F 37/304; D06F 37/02;
(Continued)

(56) References Cited

U.S. PATENT DOCUMENTS 8,258,733 B2    9/2012  Yoon et al.
2001/0011395 A1  8/2001  Skripper et al.
(Continued)

FOREIGN PATENT DOCUMENTS

DE          4225769 C2    2/1994
DE         19832292 A1    1/2000
(Continued)

*Primary Examiner* — Chun Cao
(74) *Attorney, Agent, or Firm* — Brinks Gilson & Lione (57) ABSTRACT

A method for operating a domestic appliance with a housing, a rotationally movable drum disposed in the housing for receiving laundry, a motor for driving the drum, a control device for controlling the motor, and an evaluation unit. The method, once a program of the domestic appliance has started, includes controlling the motor via the controller such that the drum is driven by the motor and the drum is moved by an angle of less than 90 degrees. Upon attaining the angle the motor is de-energised. The method includes detecting a rotational-speed signal of the drum from when the motor is de-energised over a predetermined first period, and evaluating the detected rotational-speed signals via the evaluation unit by forming a value. The method also includes interrupting the program when the value is greater than a predetermined first threshold value.

12 Claims, 5 Drawing Sheets

(51) Int. Cl.
  *D06F 58/08*  (2006.01)
  *D06F 33/02*  (2006.01)
  *D06F 37/02*  (2006.01)
  *D06F 37/30*  (2006.01)
  *G05B 15/02*  (2006.01)
  *G05D 7/06*  (2006.01)
(52) U.S. Cl.
  CPC ............ *D06F 58/08* (2013.01); *D06F 58/28*
    (2013.01); *G05B 15/02* (2013.01); *G05D*
    *7/0617* (2013.01); *D06F 2058/2858* (2013.01);
    *D06F 2058/2877* (2013.01)
(58) Field of Classification Search
  CPC ..... D06F 2058/2877; D06F 2058/2858; G05B
    15/02; G05D 7/0617
  USPC ........................................................ 700/282
  See application file for complete search history.

(56) References Cited

U.S. PATENT DOCUMENTS

| | | | |
|---|---|---|---|
| 2005/0016227 A1* | 1/2005 | Lee | D06F 37/203 68/12.04 |
| 2006/0075578 A1 | 4/2006 | Hellhake | |
| 2007/0039106 A1* | 2/2007 | Stansel | D06F 37/302 8/159 |
| 2008/0127428 A1 | 6/2008 | Hellhake | |
| 2010/0270962 A1* | 10/2010 | Yoon | D06F 33/02 318/446 |
| 2011/0012584 A1* | 1/2011 | Ivanov | D06F 37/42 324/72 |
| 2011/0030460 A1 | 2/2011 | Ashrafzadeh | |
| 2011/0113902 A1 | 5/2011 | Lilie et al. | |
| 2011/0265271 A1* | 11/2011 | Kim | D06F 37/42 8/137 |
| 2011/0314616 A1* | 12/2011 | Peterson | D06F 35/007 8/137 |
| 2012/0024016 A1* | 2/2012 | Dunn | D06F 35/007 68/12.27 |
| 2012/0124756 A1* | 5/2012 | Jung | D06F 33/02 8/137 |
| 2012/0210518 A1* | 8/2012 | Bae | D06F 33/02 8/137 |
| 2013/0133379 A1* | 5/2013 | Dogan | D06F 39/003 68/139 |
| 2014/0115792 A1* | 5/2014 | Lee | D06F 37/203 8/137 |

FOREIGN PATENT DOCUMENTS

| | | |
|---|---|---|
| DE | 102004049647 B3 | 1/2006 |
| DE | 102004049650 B3 | 3/2006 |
| DE | 102010016876 A1 | 2/2011 |
| GB | 2269395 A | 2/1994 |

* cited by examiner

METHOD FOR OPERATING A DOMESTIC APPLIANCE, AND DOMESTIC APPLIANCE

CROSS-REFERENCE TO RELATED APPLICATIONS

Priority is claimed to German Patent Application No. DE 10 2013 114 206.0, filed on Dec. 17, 2013, the entire disclosure of which is hereby incorporated by reference herein.

FIELD

The invention relates to a method for operating a domestic appliance, and to a domestic appliance. In particular, the method is suitable for a washing machine or a dryer as the domestic appliance. The domestic appliance has a housing, a rotationally movable drum, arranged in the housing, for receiving laundry, a motor for driving the drum, a control device for controlling the motor, and an evaluation unit. With such domestic appliances it is possible for living creatures such as for example children to climb into the drum and be seriously injured or killed, for example when a washing or spinning process is started.

BACKGROUND

DE 102004049650 B3 or DE 102004049647 B3 describe possible ways of encouraging children who are in the drum to move, and then being able to recognise their movement. In order to encourage the child to move, in these cases, however, water is used. This brings on one hand the problem of whether the water fed in is sufficient to encourage the child to move, and on the other hand the problem that the child might choke on the water and suffocate or drown therein. In addition, feeding in water is an impediment for programs in which laundry should not be thoroughly dampened, such as for example when spinning, pumping liquid out of the drum, or freshening-up with hot air or hot steam, since the water provides poorer starting conditions for these programs. If for example dry textiles are to be freshened up by means of hot air, it is disadvantageous if they are thoroughly wetted beforehand. Furthermore, the methods described in the above-mentioned documents cannot be used with dryers.

SUMMARY

In an embodiment, the present invention relates to a method for operating a domestic appliance with a housing, a rotationally movable drum disposed in the housing for receiving laundry, a motor for driving the drum, a control device for controlling the motor, and an evaluation unit. The method, once a program of the domestic appliance has started, includes controlling the motor via the controller such that the drum is driven by the motor and the drum is moved by an angle of less than 90 degrees. Upon attaining the angle the motor is de-energised. The method includes detecting a rotational-speed signal of the drum from when the motor is de-energised over a predetermined first period, and evaluating the detected rotational-speed signals via the evaluation unit by forming a value. The method also includes interrupting the program when the value is greater than a predetermined first threshold value.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an aspect, the invention provides for the protection for a living creature, such as a child, which is in a drum of a domestic appliance using simple means.

The advantages which can be achieved with the invention, in addition to greater safety, are that consumption of water can be avoided. The living creature, such as a child, which is in the drum of the domestic appliance does not need to move in order to be recognised. This is advantageous in particular since it is not certain anyway whether, as proposed in the prior art, water running into the drum will encourage the child to move. Therefore the method proposed herein offers greater safety. In addition, unwanted dampening of the laundry and the associated water consumption are avoided. Further, the method can be used not only for washing machines but also for dryers. The method is suitable for recognising whether there is a living creature inside the domestic appliance. In particular, the method is used to ensure that there is no child in the domestic appliance. Therefore, the method is described in the following in relation to the recognition of a child in the domestic appliance. The method is however suitable generally for recognising living creatures in a domestic appliance.

The method for operating a domestic appliance, once a program of the domestic appliance has started, comprises the steps of: controlling the motor by means of the controller, such that the drum is driven by the motor and is moved by an angle of <90°, and upon attaining the angle the motor is de-energised; detecting a rotational-speed signal of the drum from when the motor is de-energised over a predetermined first period and evaluating the detected rotational-speed signals by means of the evaluation unit by forming a value; and interrupting the program if the value is greater than a predetermined first threshold value.

The large mass, concentrated at one point, of any child which may be in the drum is utilised with this method. A continuing drum movement might result in the child turning head over heels in the drum and being injured. The motor is preferably controlled such that it turns for a fixed number of rotations which deflects the drum by an angle from the rest position. This angle must be less than 90', relative to the operational installation position of the domestic appliance, so that the child is prevented from turning head over heels. The drive power of the motor in this case is selected so that the angle is attained reliably and rapidly. As soon as the angle is attained, the motor is de-energised so that it does not introduce any driving or braking torque. Now the drum with the child which may be therein begins to perform a rocking motion which with time is damped by friction losses, so that after a certain time the rest position is resumed. In this state without driving torques, the friction between the child and the drum is sufficient for the drum and the child to perform the same rocking motion. This rocking motion is recognised by the evaluation unit. For this, starting from the moment at which the motor is de-energised, the rotational-speed signal is evaluated and a value is formed which, in the predetermined first period after the motor has been de-energised, ascertains how marked the rocking motion is. The rocking motion with a child present in the drum is considerably stronger owing to the concentrated mass than when it is laden merely with laundry with no child. If the value ascertained is greater than a predetermined first threshold value, the program is therefore interrupted.

Preferably the above steps are repeated in the event of the program being interrupted once a predetermined second period has elapsed.

In the predetermined second period, the child can be given the opportunity to free itself from the domestic appliance. Alternatively, the domestic appliance can emit a signal in order to indicate that it has established that there is a child in the drum. If in the event of the program being interrupted the above steps are repeated once the predetermined second period has elapsed, this ensures that a child which is in the drum has been removed from the drum before the program is continued. If the program is interrupted a predetermined number of times, such as for example three times, it can preferably be aborted.

With the method, recognition of rocking is carried out. It is recognised from subsequent rocking of the drum whether there is a child in the drum. Below, the method is therefore also referred to by the expression "rocking recognition".

The predetermined first period is preferably between 1 and 5 seconds. The predetermined second period is preferably between 5 and 300 seconds.

In a preferred embodiment, the value is formed by differentiation of the detected rotational-speed signals and absolute summation. The smaller the value, the less strongly marked the rocking motion of the drum. In particular, the value is ascertained using a variance of the following formula (1):

$$\text{variance} = \frac{1}{N-1} \cdot \left( \sum_{i=1}^{N} U_i^2 - \frac{1}{N} \cdot \left( \sum_{i=1}^{N} U_i \right)^2 \right) \quad (1)$$

N being equal to 400, U representing the detected rotational speed.

The angle by which the drum is moved is less than 90°, preferably between 10 and 70°, and more preferably between 20 and 50°. The specified angle of the movement of the drum relates to the angle moved out of the rest position of the drum, relative to the operational installation position of the domestic appliance.

Preferably the drive power of the motor (4) lies in the range of 50 to 500 W. This ensures that the drum by the angle is attained rapidly and reliably even in the case of a large mass moment of inertia.

The predetermined first threshold value is selected such that it is possible to distinguish between damp laundry and a child.

In a preferred embodiment, once the program has been interrupted a door of the domestic appliance which closes a loading opening arranged in the housing for loading the drum is unlocked and/or opened. This gives the child the opportunity to open the unlocked door or to remove itself from the drum of the domestic appliance and from the domestic appliance through the opened door. Alternatively or additionally, a warning signal is emitted by the domestic appliance. If only a warning signal is emitted, without the door being unlocked or opened, it is indicated to a person in the vicinity of the domestic appliance that there is a child in the domestic appliance, and they will take appropriate measures. If the warning signal is emitted in addition to an unlocked and/or opened door, this can for example ensure that a person in the vicinity of the domestic appliance will close the door of the domestic appliance again, so that the domestic appliance can continue the program, which in this case means that once again the method steps which had been carried out before the program was interrupted are repeated, in order to ensure that there is now no longer a child in the drum.

In a preferred configuration, the method comprises the steps of: feeding a predetermined amount of water into the drum if the value lies between a predetermined second threshold value, which is less than the predetermined first threshold value, and the predetermined first threshold value; detecting a rotational-speed signal of the drum over a predetermined third period after the amount of water has been fed into the drum; evaluating the detected rotational-speed signals by means of the evaluation unit by forming a variable; interrupting the program over a predetermined fourth period if the variable is greater than a predetermined third threshold value; and repeating the above steps upon interruption of the program once the predetermined fourth period has elapsed.

The second threshold value represents a further safety precaution. If the predetermined first threshold value has not been exceeded, but the predetermined second threshold value has, then the domestic appliance will be unable to determine with certainty whether a child or alternatively a large, and possibly also damp, amount of laundry is in the drum of the domestic appliance. In this case, for further protection, an attempt is made to encourage any child which may be in the domestic appliance to move by feeding a predetermined amount of water into the drum. It is possible, in particular with small loads, to design the water infeed such that no dampening of the laundry occurs. In the case of relatively large or alternatively possibly damp amounts of laundry, for safety reasons if necessary it will be accepted that the laundry will be dampened. If once the water has been fed in an impermissible movement of the drum is recognised by the variable ascertained being greater than the predetermined third threshold value, the door is unlocked or opened, and/or a warning signal is emitted by the domestic appliance. Methods for monitoring impermissible movement of the drum once water has been fed into the drum are described in DE 102004049647 B3 and DE 102004049650 B3, the disclosures of which are hereby fully incorporated herein.

In a preferred embodiment, the program, if interrupted a predetermined number of times, is continued if the program provides for water to be fed into the drum, and is aborted if the program does not provide for any inflow of water into the drum. In this method variant, the domestic appliance is a washing machine. In certain cases, such as when loading a washing machine with damp laundry, in which the wetness adds weight in addition to the laundry, it may be difficult to distinguish whether there is a child or damp laundry in the washing machine. If the program of the washing machine does not provide for water to be fed into the drum, it is improbable that damp laundry has been loaded into the washing machine. Therefore the program is aborted in this case. If the program provides for water to be fed into the drum, the program is continued. Owing to the water being fed into the drum, a child can be encouraged to move, and the movement of the child can be detected, as described for example in DE 102004049647 B3 or DE 102004049650 B3.

In a preferred embodiment, the method variant in which the program provides for water to be fed into the drum comprises the steps of: activating a pump in order to pump liquid out of the drum; detecting a rotational-speed signal of the drum over a predetermined fifth period; evaluating the detected rotational-speed signals by means of the evaluation unit by forming a pump-out value; interrupting the program over a predetermined sixth period if the pump-out value is greater than a predetermined fourth threshold value; repeating the above steps upon interruption of the program once the predetermined sixth period has elapsed a predetermined number of times; and aborting the program if the predetermined number of times is reached. The pump-out value can be ascertained using formula (1) above. In this configuration of the method, an attempt is made by the activation of the pump to encourage a child which is in the drum to move, and to detect the movement of the child. Here a movement recognition upon pumping is carried out.

Preferably the method, if the program provides for water to be fed into the drum, comprises the steps of: activating an inflow of water into the drum; detecting a rotational-speed signal of the drum over a predetermined seventh period after the amount of water has been fed into the drum; evaluating the detected rotational-speed signals by means of the evaluation unit by forming a water-infeed value; interrupting the program over a predetermined eighth period if the water-infeed value is greater than a predetermined fifth threshold value; repeating the above steps upon interruption of the program once the predetermined eighth period has elapsed a predetermined number of times; aborting the program if the predetermined number of times is reached. The water-infeed value can be ascertained using formula (1) above. In this configuration of the method, an attempt is made by feeding water into the drum to encourage a child which is in the drum to move, and to detect the movement of the child. Here a movement recognition upon feeding in water is carried out. The movement recognition upon feeding in water is preferably carried out after the movement recognition upon pumping.

In a preferred embodiment, the method, following the inflow of water into the drum, furthermore comprises the steps of: deactivating the inflow of water into the drum; detecting a rotational-speed signal of the drum over a predetermined ninth period; evaluating o the detected rotational-speed signals by means of the evaluation unit by forming a final recognition value; interrupting the program over a predetermined tenth period if the final recognition value is greater than a predetermined sixth threshold value; repeating the above steps upon interruption of the program once the predetermined tenth period has elapsed a predetermined number of times; aborting the program if the predetermined number of times is reached. The final recognition value can be ascertained using formula (1) above. In this configuration of the method, an attempt is made to detect with high sensitivity a movement of a child which is in the drum. Here a movement recognition once water has been fed in is carried out.

Preferably, in one configuration of the method in which the program provides for water to be fed into the drum of a washing machine, first of all the recognition of a rocking motion described above is carried out. Then the movement recognition upon pumping, the movement recognition upon feeding in water, and/or the movement recognition after feeding in water can be carried out in succession.

The invention furthermore relates to a domestic appliance with a housing, a rotationally movable drum arranged in the housing, a motor for driving the drum, a control device for controlling the motor, and an evaluation unit, wherein the control device is configured to operate the domestic appliance in accordance with the method described above. The domestic appliance is capable, using the rocking motion of the drum initiated by the method, of recognising whether there is a child in the drum, and in this case of interrupting the program so that the child can free itself from the drum or can be removed therefrom. Advantageously the domestic appliance is furthermore capable of carrying out a movement recognition, as described above. The domestic appliance is preferably a washing machine, a dryer or a combination thereof. The domestic appliance is in particular configured to detect a child in its drum, but can also be designed to recognise a different living creature, such as for example a dog, a cat or a rabbit.

An example of the invention is illustrated purely diagrammatically in the drawings, and will be described in greater detail below.

Figure 1:
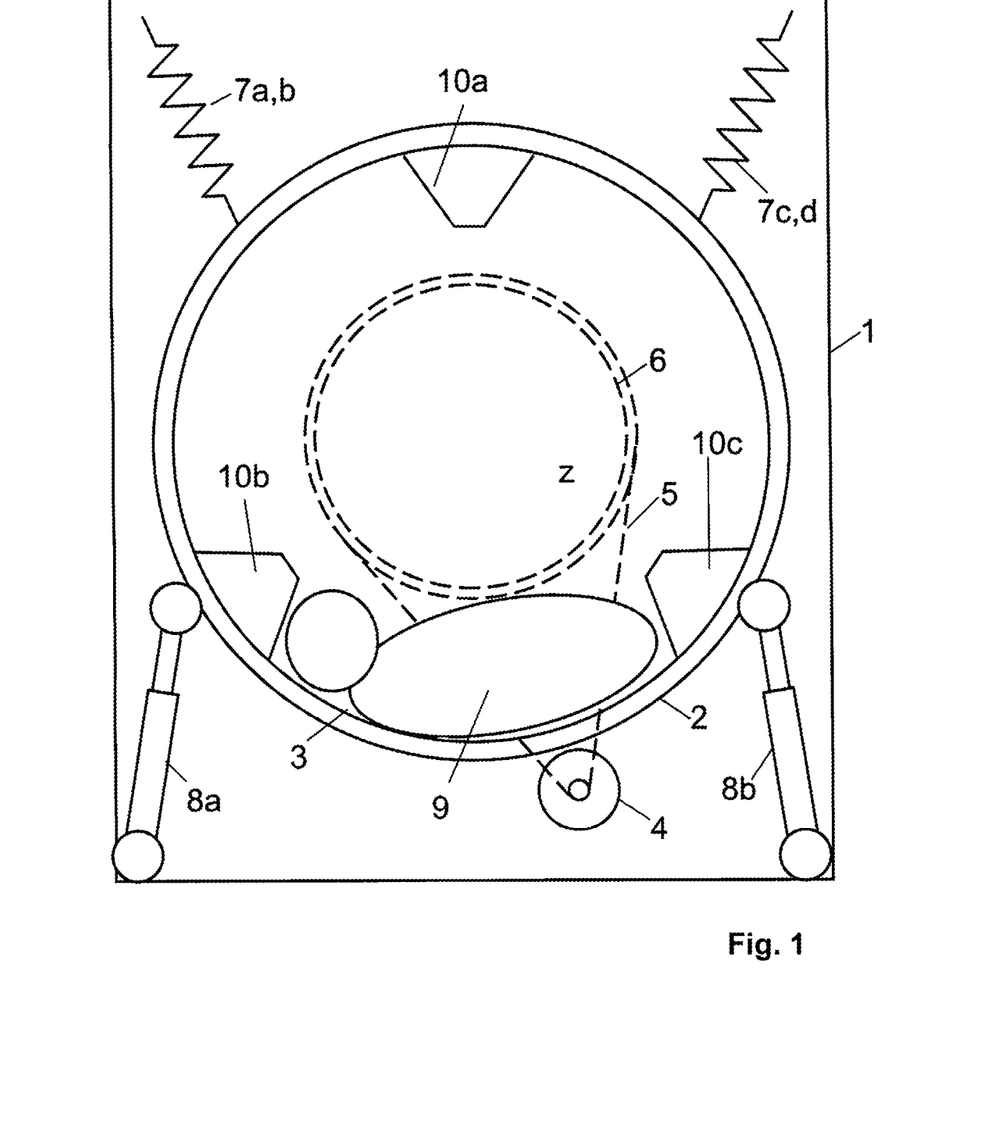
FIG. 1 shows diagrammatically a cross-sectional view of a domestic appliance.

FIG. 1 shows diagrammatically a cross-sectional view of a domestic appliance, which in this case is a washing machine. The washing machine is shown in its operational installation position. Any details of location relate to the operational installation position. A suds container 2 is suspended, so as to be able to oscillate, from a housing 1 or load-carrying parts of the housing 1, which are not described further, via springs 7*a,b* and 7*c,d*. Within the suds container 2 there is arranged a rotatably mounted drum 3, which moves laundry situated in the suds container during a program. The drum 3 in this example is manufactured from high-grade steel and has a large number of openings, so that water or washing liquid can flow through the drum. In the interior of the drum 3 there are arranged entraining elements 10*a*, 10*b* and 10*c*, for example in the form of drum ribs. The drum 3 is driven via its bearing 6 by means of an electric motor 4 via a belt 5. Instead of the belt drive 5 shown, other drive units are however also conceivable. The motor 4 has a sensor for detecting the rotational speed. Alternatively, it itself serves as a rotational-speed sensor. Alternatively, the washing machine may have a separate rotational-speed sensor. Corresponding to the above embodiment in question, the washing machine has an evaluation unit which evaluates rotational-speed signals of the rotational-speed sensor. The rotational speed of the motor 4 is controlled by a control unit. The bearing 6 is arranged on the rear part of the washing machine, relative to its operational installation position. Located opposite the bearing 6, i.e. in the front part of the washing machine, the housing 1 has a loading opening via which the interior of the drum 3 can be accessed, so that laundry can be loaded, and which can be closed by means of a door. In FIG. 1 there is a child 9 in the drum 3.

In order to carry out the method, the motor 4 is triggered such that it preferably rotates a number of rotations which deflects the drum 3 by an angle which is less than 90°, preferably between 20 and 50°. As soon as the angle is attained, the motor 4 is de-energised, so that it no longer introduces any driving or braking torque into the system. The drum 3 with the child 9 which is therein begins to perform a rocking motion which with time is damped by friction losses in the system, so that after a certain time the rest position is resumed. In this state without driving torques, the friction between the child 9 and the drum 3 is sufficient for the drum 3 and the child 9 to perform the same rocking motion. This rocking motion is recognised by the evaluation unit, which is preferably integrated in the motor 4. By evaluating rotational-speed signals which are detected by the rotational-speed sensor from the de-energising onwards over a predetermined first period, it is ascertained how marked the rocking motion is. For this, from the moment of de-energising the motor 4 onwards the rotational-speed signal is evaluated by means of differentiation and absolute summation, and a value is formed which ascertains in a predetermined first period how marked the rocking motion is. The rocking motion, when there is a child 9 in the drum 3, is considerably stronger owing to the concentrated mass than when laundry is in the drum 3. Masses located well to the outside result in strong rocking-out of the drum 3, and indicate that the child 9 is in the drum 3. If the value lies above a predetermined first threshold value, the rocking motion is so marked that a child 9 in the drum 3 is detected and the program is interrupted. Preferably the door is unlocked or opened and/or a warning signal is emitted by the washing machine. Once a predetermined second period has elapsed, the above steps are preferably repeated in order to establish whether the child 9 is still in the drum 3. If it is established that the child 9 is still in the drum 3, the above steps are repeated once again. If it is then still established that the child 9 is in the drum 3, the program is aborted after a predetermined number of repetitions of the method. The washing machine emits a warning signal and/or the door remains unlocked or opened. If the value lies below the predetermined first threshold value, the rocking motion is marked so little that the probability of the child 9 being in the drum 3 is low, and the intended program sequence is continued without the door being opened or unlocked.

In an alternative embodiment, which is suitable in particular for a washing machine with a large load or for dryers, a predetermined second threshold value is provided for greater safety. The larger the load of laundry in a washing machine, the more difficult it is to distinguish the child 9 from the laundry in the drum 3. The damper the laundry, the heavier it is, and therefore in the case of dryers it is likewise more difficult to distinguish the child 9 in the drum 3 from damp loaded laundry. The predetermined second threshold value is less than the predetermined first threshold value. If the value from the evaluation unit is greater than the predetermined first threshold value, the child 9 is in the drum 3 and should be removed from the washing machine or the dryer before the program is continued. If the value from the evaluation unit is greater than the predetermined second threshold value but less than the predetermined first threshold value, the rocking motion is more strongly marked than it should be, but not so strongly marked that the child 9 actually must be in the washing machine or the dryer. It is therefore not clear whether this rocking motion is caused by a child 9 in the drum 3 or by the weight of the laundry. If the value from the evaluation unit lies between the predetermined second threshold value and the predetermined first threshold value, water is fed into the drum in order to encourage any child which may be in the drum 3 to move. If after feeding in water an impermissible movement of the drum 3 is detected, the door is unlocked or opened and/or a warning signal is emitted by the washing machine or the dryer.

The washing machine shown in FIG. 1 can be used for the methods shown in FIGS. 2 to 5. Any components named in FIGS. 2 to 5 relate to the washing machine shown in FIG. 1.

Figure 2:
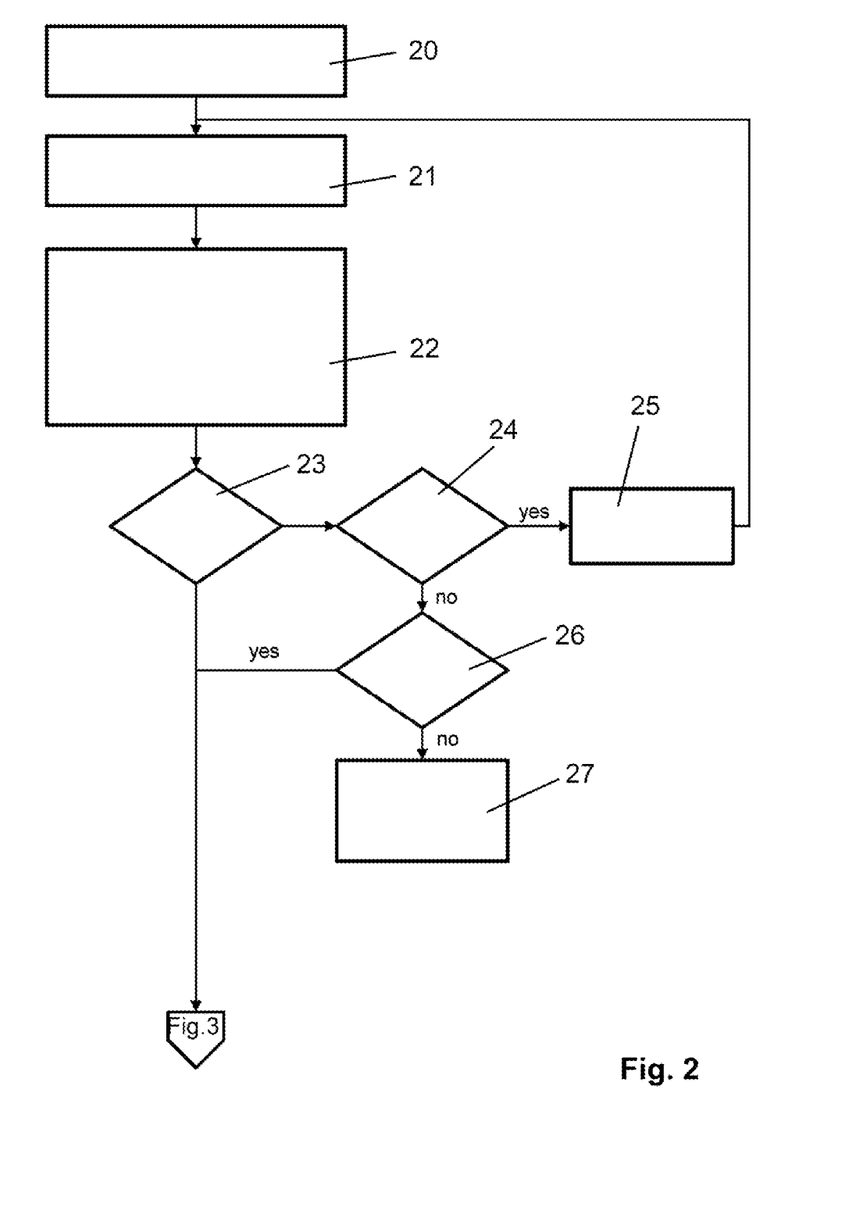
FIG. 2 is a flowchart of a method.

FIG. 2 is a flowchart of a method. FIG. 2 shows the sequence of a method for recognising a rocking motion of the drum of the washing machine. In step 20, the program of the washing machine is started. That is to say, a program for washing laundry is started by pushing a start button on the washing machine. In step 21, the drum is deflected out of the rest position by 30°. This is effected by the controller controlling the motor, so that the motor drives the drum to move by the angle of 30°. If the drum attains the angle of 30°, the motor is de-energised in step 21. In step 22, a rotational-speed signal of the drum is detected from the de-energising of the motor onwards over a predetermined first period, and the rotational-speed signals detected are evaluated by the evaluation unit by forming a value. That is to say that in step 22 the intensity of the rocking is ascertained by forming the variance of the rotational-speed signal. The requirements for the rotational-speed signal are that the voltage and the frequency are proportional to the rotational speed. The resolution is 0.5°. It is necessary for a rotation to be recognised at 0.5 min-1. In step 22, a voltage analysis of the rotational-speed signal is carried out for a time of 2 seconds. The ascertaining of the variance of the rotational-speed signal at a scanning frequency of 200 Hz can take place in accordance with the following formula:

$$\text{variance} = \frac{1}{N-1} \cdot \left( \sum_{i=1}^{N} U_i^2 - \frac{1}{N} \cdot \left( \sum_{i=1}^{N} U_i \right)^2 \right)$$

N being equal to 400, U representing the detected rotational speed.

In step 23 it is ascertained whether the variance is greater than a predetermined first threshold value. If the variance is less than the predetermined first threshold value, i.e. no child is recognised in the drum, the method is continued with step 30, which is shown and described in FIG. 3. If the variance is greater than the predetermined first threshold value, i.e. a child is recognised in the drum, the method is continued with step 24. In step 24 it is established how many times a child has been recognised in the drum. If N_LE<N_LE1_max, with N_LE as the counter for the number of the rocking recognition, which at the beginning of the program is set to zero, and N_LE1_max as the maximum number of times the method is repeated, the method is continued with step 25 (yes). In step 25, the program is interrupted for a predetermined second period and the door is unlocked and the counter is increased by 1, so that: N_LE=N_LE+1. After step 25, the method is continued from step 21 once the predetermined second period has elapsed. If it is established in step 24 that N_LE=N_LE1_max (no), step 24 is followed by step 26, in which it is ascertained whether the program provides for water to be fed into the drum. If no, the program is aborted in step 27 and the door is unlocked or opened and/or a warning signal is emitted in order to indicate that there is a child in the washing machine. If yes, the method shown in FIG. 3 follows on from step 26.

Figure 3:
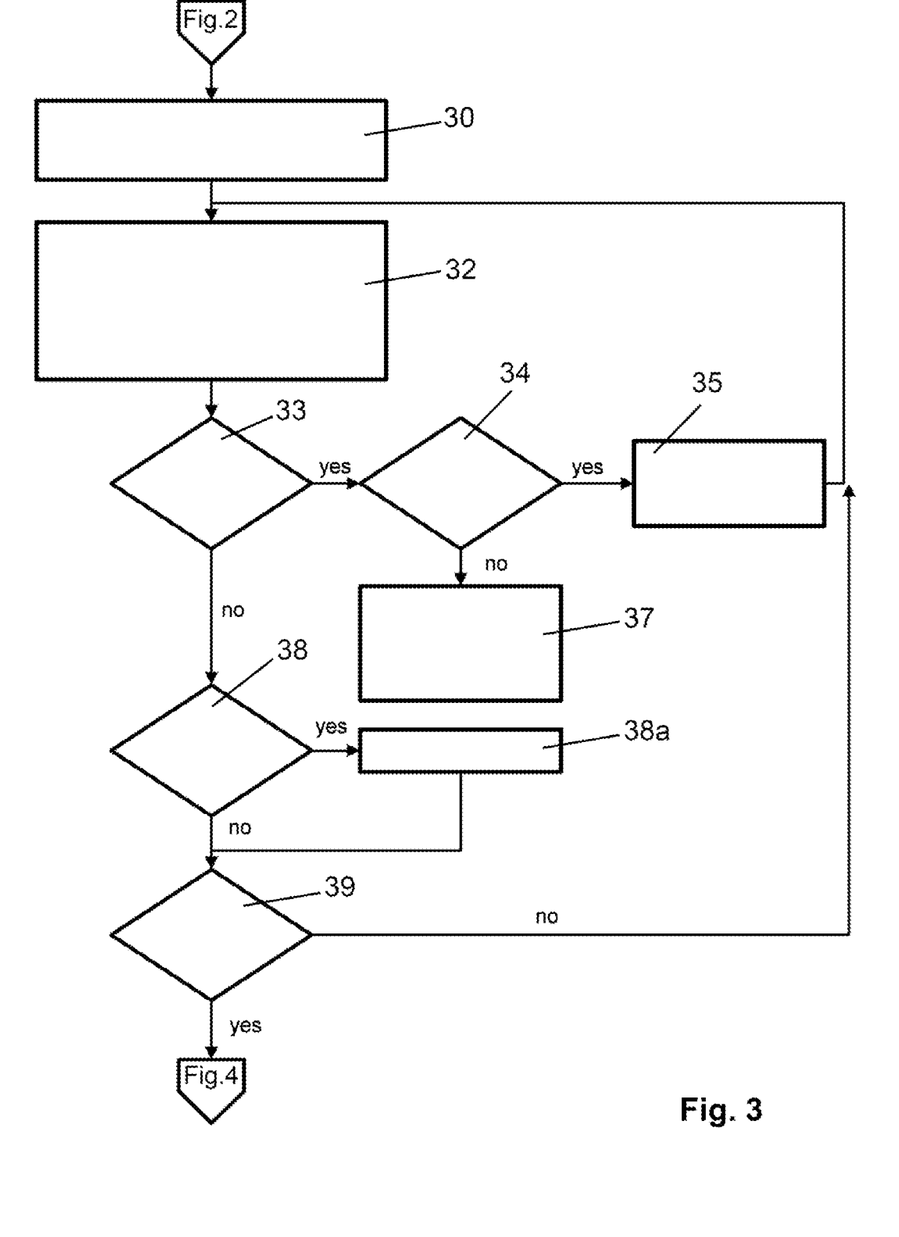
FIG. 3 is a flowchart of a method following on from the method shown in FIG. 2.

FIG. 3 is a flowchart of a method following on from the method shown in FIG. 2. FIG. 3 shows a sequence of a method for recognising a movement upon pumping. The method shown in FIG. 3 begins with step 30, which follows on from step 23 or 26 of the method shown in FIG. 2. In step 30, a pump for pumping liquid out of the drum or the suds container, in particular what is called a suds pump, is activated. The activation of the pump serves primarily to startle and move any child which is in the drum by the noise and the movement of the pump which is caused. The counter explained in FIG. 2 is in addition re-set to zero in step 30, so that N_LE=0. Then step 32, which corresponds to step 22 from FIG. 2, is carried out. In contrast to step 22, in step 32 N is 200. After step 32, step 33 is carried out. In step 33 it is ascertained whether the variance ascertained in step 32 is greater than the predetermined fourth threshold value described above. If yes, i.e. a child is recognised in the drum, the method is continued with step 34. In step 34 it is established how many times a child has been recognised in the drum. If N_LE<N_LE2_max, with N_LE as the counter for the number of the movement recognition upon pumping, which at the beginning of the program is set to zero, and N_LE2_max as the maximum number of times the method is repeated, the method is continued with step 35 (yes). In step 35, the program is interrupted for a predetermined sixth period and the door is unlocked and the counter is increased by 1, so that: N_LE=N_LE+1. After step 35, the method is continued from step 32 once the predetermined sixth period has elapsed. If it is established in step 34 that N_LE=N_LE2_max, i.e. the answer to the question of whether the variance ascertained in step 32 is greater than a predetermined fourth threshold value is no, step 37 follows step 34. In step 37 the program is aborted and the door unlocked or opened and/or a warning signal emitted, in order to indicate that there is a child in the washing machine. If the variance ascertained in step 33 is less than the predetermined fourth threshold value, i.e. no child is recognised in the drum and the question of whether the variance ascertained in step 32 is greater than the predetermined fourth threshold value is answered in the negative, the method is continued with step 38. In step 38 it is ascertained whether the pumping time is exceeded or the pressure has dropped too low. If the answer to at least one of the two questions is yes, step 38 is followed by step 38a, in which the pump is switched off. After step 38a, the method is continued with step 39. If the answer to both questions asked in step 38 is no, likewise step 39 is carried out after step 38. In step 39 it is checked whether a predetermined fifth period has elapsed. If no, then the method is continued from step 32. If yes, then there is a switch to the method described in FIG. 4, and it continues with step 40.

Figure 4:
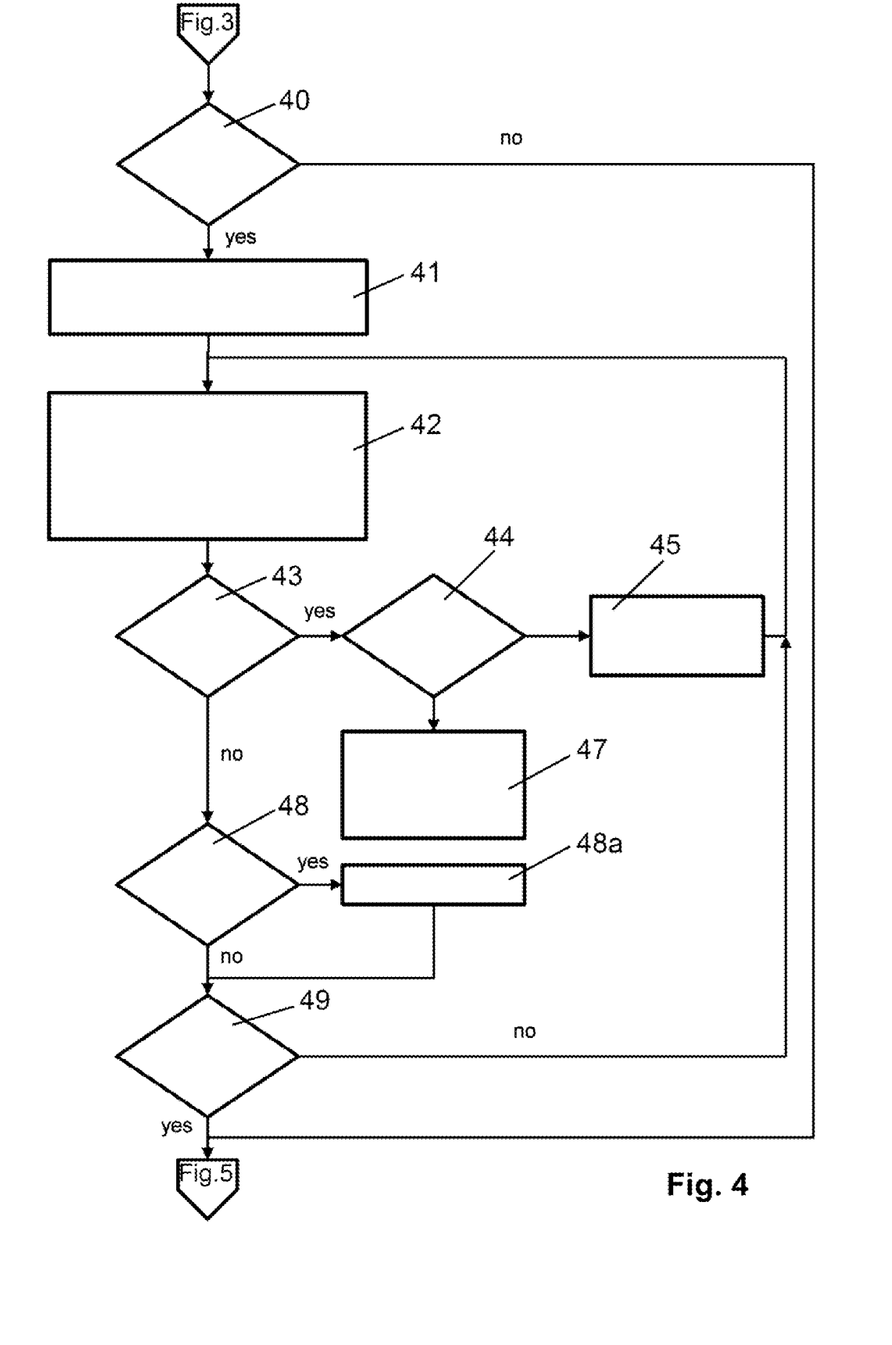
FIG. 4 is a flowchart of a method following on from the method shown in FIG. 3.

FIG. 4 is a flowchart of a method following on from the method shown in FIG. 3. After the method step 39 shown in FIG. 3, step 40 is carried out. In step 40 it is ascertained whether the program provides for water to be fed into the drum. If no, then there is a switch to the method shown in FIG. 5. If yes, then step 41 is carried out. In step 41, an inflow of water into the drum is activated. In addition, in step 41 the counter explained in FIG. 2 is re-set to zero, so that N_LE=0. Then step 42, which corresponds to the step 32 carried out in FIG. 3, is carried out. For a description of precisely how step 42 is carried out, reference is made to FIG. 3. Step 43 follows step 42. In step 43 it is ascertained whether the variance ascertained in step 42 is greater than a predetermined fifth threshold value. If yes, i.e. a child is recognised in the drum, the method is continued with step 44. In step 44 it is established how many times a child has been recognised in the drum. If N_LE<N_LE3_max, with N_LE as the counter for the number of the movement recognition upon the inflow of water, which at the beginning of the program is set to zero, and N_LE3_max as the maximum number of times the method is repeated, the method is continued with step 45. In step 45, the program is interrupted for a predetermined eighth period and the door is unlocked and the counter is increased by 1, so that: N_LE=N_LE+1. After step 45, once the predetermined eighth period has elapsed, the method is continued from step 42. If it is established in step 44 that N_LE=N_LE3_max, step 44 is followed by step 47, in which the program is aborted and the door is unlocked or opened and/or a warning signal is emitted, in order to indicate that there is a child in the washing machine. If the variance ascertained in step 43 is less than a predetermined fifth threshold value, i.e. no child is recognised in the drum and the answer to the question of whether the variance ascertained in step 42 is greater than the predetermined fifth threshold value is no, the method is continued with step 48. In step 48 it is ascertained whether the water infeed into the drum is terminated. If yes, then step 48 is followed by step 48a, in which the water infeed is stopped. After step 48a, the method is continued with step 49. If it is established in step 48 that the water infeed into the drum is not terminated (no), likewise step 49 is carried out after step 48. In step 49 it is checked whether a predetermined seventh period has elapsed. If no, then the method is continued from step 42. If yes, then there is a switch to the method described in FIG. 5, and it continues with step 50.

Figure 5:
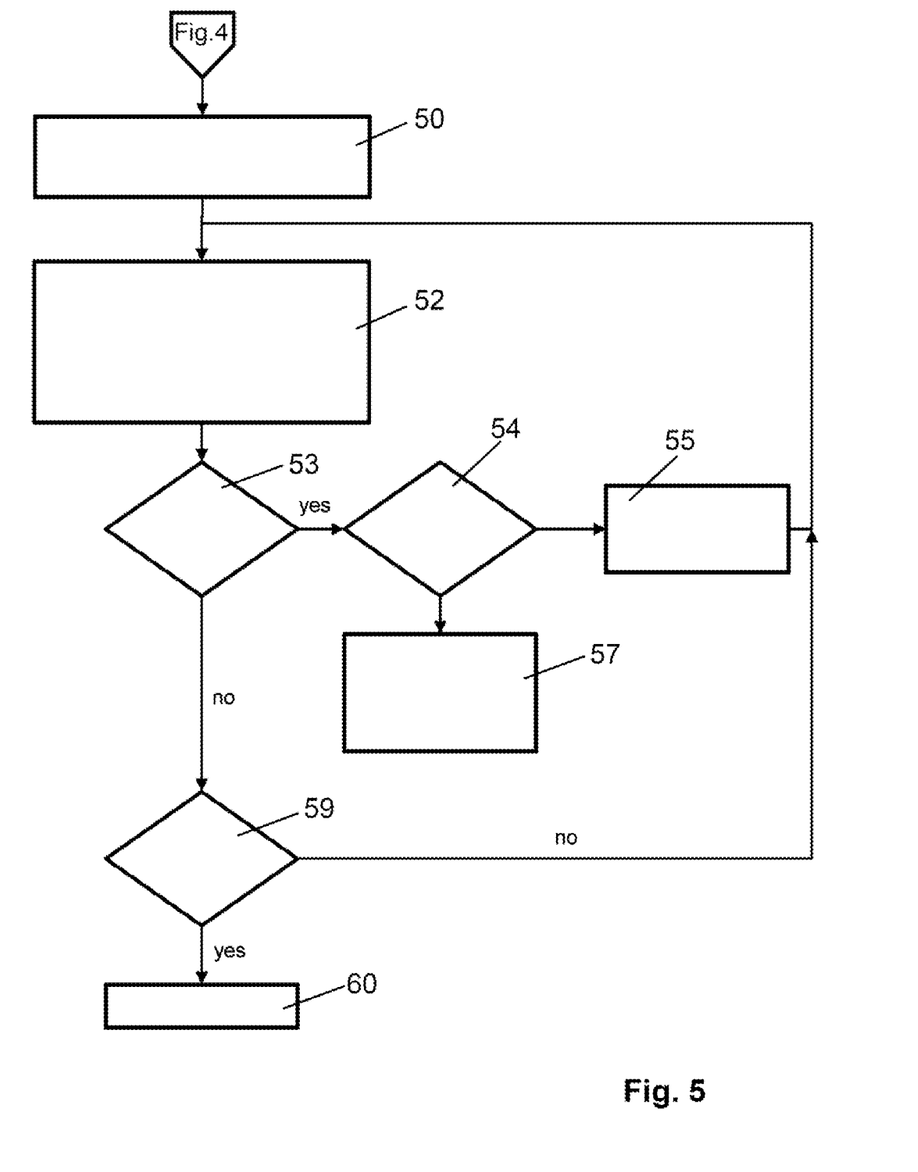
FIG. 5 is a flowchart of a method following on from the method shown in FIG. 4.

FIG. 5 is a flowchart of a method following on from the method shown in FIG. 4. After the step 49 or 40 shown in FIG. 4, step 50 is carried out. In step 50, the counter explained in FIG. 2 is re-set to zero, so that N_LE=0. Then step 52, which corresponds to the step 32 carried out in FIG. 3, is carried out. For a description of precisely how step 52 is carried out, reference is made to FIG. 3. Step 53 follows step 52. In step 53 it is ascertained whether the variance ascertained in step 52 is greater than a predetermined sixth threshold value. If yes, i.e. a child is recognised in the drum, the method is continued with step 54. In step 54 it is established how many times a child has been recognised in the drum. If N_LE<N_LE4_max, with N_LE as the counter for the number of the movement recognition, which at the beginning of the program is set to zero, and N_LE4_max as the maximum number of times the method is repeated, the method is continued with step 55. In step 55, the program is interrupted for the predetermined tenth period described above, and the door is unlocked and the counter is increased by 1, so that: N_LE=N_LE+1. After step 55, once a predetermined tenth period has elapsed the method is carried out further from step 52. If it is established in step 54 that N_LE=N_LE4_max, step 54 is followed by step 57, in which the program is aborted and the door is unlocked or opened and/or a warning signal is emitted in order to indicate that there is a child in the washing machine. If the variance ascertained in step 53 is less than the predetermined sixth threshold value, i.e. no child is recognised in the drum and the question of whether the variance is greater than a predetermined sixth threshold value is answered in the negative, the method is continued with step 59. In step 59 it is checked whether a predetermined ninth period has elapsed. If no, then the method is continued from step 52. If yes, step 60 is begun. In step 60, the program is implemented; that is to say that the washing operation of the washing machine begins from step 60.

In steps 22, 32, 42 and 52, in each case the variance is ascertained from the rotational-speed signals. The sensitivity of the variance can be set individually in each of these steps. It has been shown that a high sensitivity of the variance in steps 22, 32 and 52 is advantageous, whereas the sensitivity of the variance in step 42 is preferably lower compared with that in steps 22, 32 and 52. In exactly the same way, the respective periods in steps 25, 35, 45 and 55, in which the program is interrupted, can be set individually in each case. The respective periods in the methods shown in FIGS. 2 to 5, in which the recognition of the rocking motion, of the movement upon pumping, of the movement upon feeding in water, and upon the movement after feeding in water are carried out, can likewise be set individually in each case.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

| LIST OF REFERENCE NUMERALS | |
|---|---|
| 1 | housing |
| 2 | suds container |
| 3 | drum |
| 4 | motor |
| 5 | belt drive |
| 6 | bearing |
| 7a, b, c, d | springs |
| 8a, b | dampers |
| 9 | child |
| 10a, b, c | entraining elements. |

What is claimed is:

1. A method for operating a domestic appliance with a housing, a rotationally movable drum disposed in the housing for receiving laundry, a motor for driving the drum, a control device for controlling the motor, and an evaluation unit, the method, once a program of the domestic appliance has started, comprising the steps of:
controlling the motor using the control device such that the drum is driven by the motor and the drum is moved by an angle of less than 90 degrees, and upon attaining the angle, the motor is de-energised;
detecting a rotational-speed signal of the drum from when the motor is de-energised over a predetermined first period, and evaluating the detected rotational-speed signal using the evaluation unit by forming a value; and
interrupting the program of the domestic appliance when the value is greater than a predetermined first threshold value,
wherein the controlling, the detecting, and the interrupting the program of the domestic appliance when the value is greater than the predetermined first threshold value are performed before the program of the domestic appliance causes any water to be added to the drum.

2. The method according to claim 1, wherein, if the program is interrupted, the steps of claim 1 are repeated once a predetermined second period has elapsed.

3. The method according to claim 1, wherein the value is formed by differentiation of the detected rotational-speed signal and absolute summation.

4. The method according to claim 1, wherein the angle is in a range between 20 degrees and 50 degrees.

5. The method according to claim 1, wherein a drive power of the motor is in a range from 50 W to 500 W.

6. The method according to claim 1, wherein, if the program of the domestic appliance is interrupted, a door of the domestic appliance, which closes a loading opening arranged in the housing for loading the drum, is at least one of unlocked, opened, or a warning signal is emitted.

7. The method according to claim 1, further comprising the steps of:
feeding a predetermined amount of water into the drum when the value is between a predetermined second threshold value, which is less than the predetermined first threshold value, and the predetermined first threshold value;
detecting a rotational-speed signal of the drum over a predetermined third period after the predetermined amount of water has been fed into the drum;
evaluating the detected rotational-speed signal using the evaluation unit by forming a variable; and
interrupting the program of the domestic appliance over a predetermined fourth period when the variable is greater than a predetermined third threshold value.

8. The method according to claim 1, wherein the domestic appliance is a washing machine and the program of the domestic appliance, when interrupted a predetermined number of times, is continued when the program of the domestic appliance provides for water to be fed into the drum, and
wherein the program of the domestic appliance, when interrupted the predetermined number of times, is aborted when the program does not provide for any inflow of water into the drum.

9. The method according to claim 8, wherein, when the program of the domestic appliance provides for water to be fed into the drum, the method further comprises the steps of:
activating a pump in order to pump liquid out of the drum;
detecting a rotational-speed signal of the drum over a predetermined fifth period;
evaluating the detected rotational-speed signal using the evaluation unit by forming a pump-out value;
interrupting the program of the domestic appliance over a predetermined sixth period when the pump-out value is greater than a predetermined fourth threshold value;
repeating the above steps upon interruption of the program of the domestic appliance when the predetermined sixth period has elapsed a predetermined number of times; and
aborting the program of the domestic appliance when the predetermined number of times is reached.

10. The method according to claim 9, wherein:
when the program of the domestic appliance provides for water to be fed into the drum, the method further comprises the steps of:
activating an inflow of water into the drum,
detecting a rotational-speed signal of the drum over a predetermined seventh period after the amount of water has been fed into the drum, evaluating the detected rotational-speed signal using the evaluation unit by forming a water-infeed value, interrupting the program of the domestic appliance over a predetermined eighth period when the water-infeed value is greater than a predetermined fifth threshold value, repeating the above steps upon interruption of the program of the domestic appliance when the predetermined eighth period has elapsed a predetermined number of times, and aborting the program of the domestic appliance when the predetermined number of times is reached;

and when the program is not aborted, the method further comprises the steps of:

deactivating the inflow of water into the drum, detecting a rotational-speed signal of the drum over a predetermined ninth period, evaluating the detected rotational-speed signal using the evaluation unit by forming a final recognition value, interrupting the program of the domestic appliance over a predetermined tenth period when the final recognition value is greater than a predetermined sixth threshold value, upon interruption of the program of the domestic appliance when the predetermined tenth period has elapsed, repeating the above steps from the step of deactivating the inflow of water into the drum a predetermined number of times, and aborting the program of the domestic appliance if the predetermined number of times is reached.

11. The method according to claim 7, further comprising repeating the steps of claim 7 upon interruption of the program of the domestic appliance once the predetermined fourth period has elapsed.

12. A domestic appliance comprising:

a housing;

a rotationally movable drum arranged in the housing;

a motor for driving the drum;

a control device for controlling the motor; and an evaluation unit, wherein the control device is configured to:

control the motor such that the drum is driven by the motor and the drum is moved by an angle of less than 90 degrees, and upon attaining the angle the motor is de-energised, detect a rotational-speed signal of the drum from when the motor is de-energised over a predetermined first period, and evaluating the detected rotational-speed signal using the evaluation unit by forming a value; and interrupt a program of the domestic appliance when the value is greater than a predetermined first threshold value, wherein the controlling, the detecting, and the interrupting are performed before the program of the domestic appliance causes any water to be added to the drum.

* * * * *